United States Patent
Northcutt et al.

(10) Patent No.: US 6,678,741 B1
(45) Date of Patent: Jan. 13, 2004

(54) METHOD AND APPARATUS FOR SYNCHRONIZING FIRMWARE

(75) Inventors: J. Duane Northcutt, Menlo Park, CA (US); Gerard A. Wall, San Jose, CA (US); James G. Hanko, Redwood City, CA (US); Benjamin H. Stoltz, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/289,787

(22) Filed: Apr. 9, 1999

(51) Int. Cl.$^7$ ............................................. G06F 15/16
(52) U.S. Cl. .................. 709/248; 709/203; 709/222; 709/223; 709/224; 709/238; 707/10; 707/8; 707/201; 707/203; 717/168; 717/177
(58) Field of Search .......................... 380/23; 709/203, 709/220, 222, 246, 248, 223, 224, 215, 227, 229, 238; 717/168, 177; 707/203, 200, 8; 455/419

(56) References Cited

U.S. PATENT DOCUMENTS

| | | | | |
|---|---|---|---|---|
| 5,761,439 A | * | 6/1998 | Kar et al. | 709/248 |
| 5,926,816 A | * | 7/1999 | Bauer et al. | 707/8 |
| 5,970,143 A | * | 10/1999 | Schneier et al. | 380/23 |
| 5,999,947 A | * | 12/1999 | Zollinger et al. | 707/203 |
| 6,029,203 A | * | 2/2000 | Bhatia et al. | 709/244 |
| 6,061,740 A | * | 5/2000 | Ferguson et al. | 709/246 |
| 6,061,741 A | * | 5/2000 | Murphy, Jr. et al. | 709/203 |
| 6,088,803 A | * | 7/2000 | Tso et al. | 713/201 |
| 6,138,009 A | * | 10/2000 | Birgerson | 455/419 |
| 6,161,146 A | * | 12/2000 | Kley et al. | 709/248 |
| 6,202,207 B1 | * | 3/2001 | Donohue | 717/11 |
| 6,212,557 B1 | * | 4/2001 | Oran | 709/221 |
| 6,253,228 B1 | * | 6/2001 | Ferris et al. | 709/203 |
| 6,324,693 B1 | * | 11/2001 | Brodersen et al. | 717/177 |
| 6,341,291 B1 | * | 1/2002 | Bentley et al. | 707/203 |
| 6,393,434 B1 | * | 5/2002 | Huang et al. | 707/200 |
| 6,477,543 B1 | * | 11/2002 | Huang et al. | 707/200 |
| 2002/0013839 A1 | * | 1/2002 | Champlin | 709/224 |

* cited by examiner

Primary Examiner—Hosain T. Alam
Assistant Examiner—Thu Ha Nguyen
(74) Attorney, Agent, or Firm—O'Melveny & Myers LLP

(57) ABSTRACT

The invention is a method and apparatus for synchronizing firmware associated with a first computer device and a second computer device, such as a server and a client computer. In accordance with one embodiment of the invention, the method comprises the steps of providing information regarding a characteristic of the firmware associated with the first and second devices, comparing the provided firmware information to determine if the firmware is synchronized, and associating new firmware with the second device to synchronize the firmware if the firmware is found to not be synchronized in the comparing step. In one or more embodiments of the invention, the firmware associated with the second device is not modified unless the integrity of the firmware to be installed on the second device is verified using a digital signature.

21 Claims, 7 Drawing Sheets

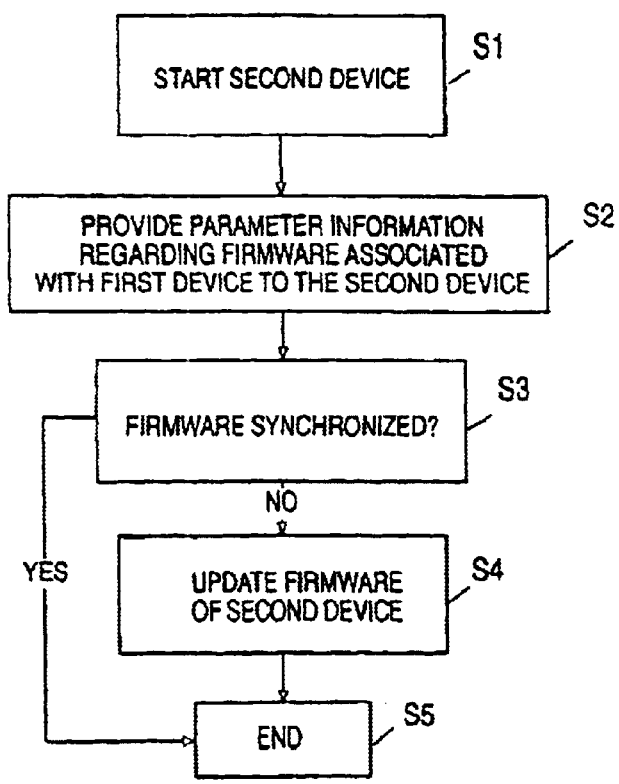
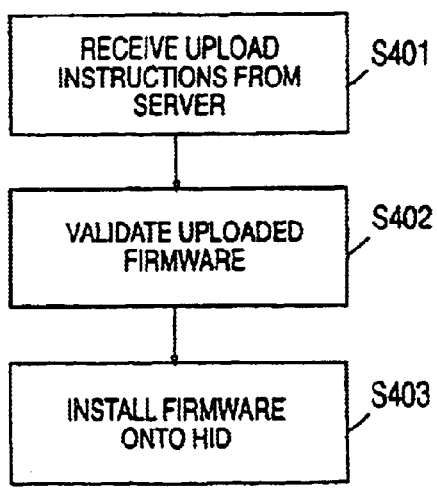
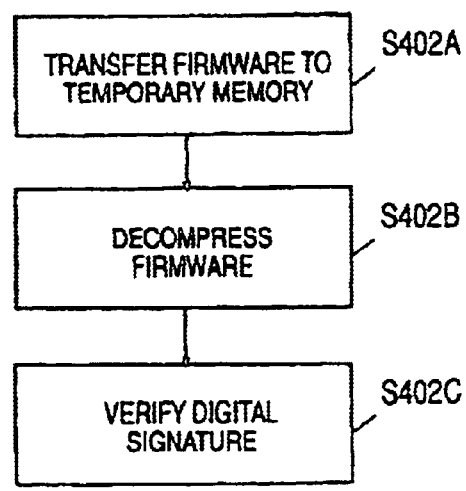

METHOD AND APPARATUS FOR SYNCHRONIZING FIRMWARE

BACKGROUND OF THE INVENTION

1. Field of the Invention

This invention relates to computing devices, and more particularly, to a method and apparatus for synchronizing the firmware associated with such devices.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun Microsystems, Java and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

2. Background Art

In many electronic information communication paradigms, first and second devices communicate with one another even though they may be physically remote. One such arrangement is that where a remote client computer station communicates with another client computer station or a central server.

Generally, in order for the devices to communicate, they must interact by way of a common protocol, otherwise the devices will not "understand" one another. It is often difficult, however, to ensure that both devices, such as a server and a remote workstation as described above, are arranged to utilize the same protocol. An incompatibility of the protocol between two devices may arise from changes in the protocol of one but not both devices. A change in protocol may arise when the firmware, such as software, is upgraded on one but not all devices to a more recently released or "newer" version.

As an example, in the server/remote workstation arrangement described above, it is common for the users or clients of the remote workstation(s) to upgrade the version of the software implemented at only their workstation. Upgrades to the server may be controlled by a completely independent entity, such as a system administrator, and not be coordinated at all with changes in the firmware (and thus protocol) at the remote workstation(s).

It may be possible to manually compare the firmware "version" information in order to determine if the workstation and server are operating with the same protocol. It is often impractical to change the protocol of the server, and as such it is common for the remote workstation to be updated with the appropriate version of the firmware. Thus, if a user determines that the firmware at the workstation is "older," in the sense of a having numerically lower version number than that of the version operated by the server, the user may update software or firmware on the workstation. There are numerous pitfalls associated with such a procedure.

A first problem is simply that there is no reliable mechanism for ensuring that multiple workstations and the server (s) are all continuously updated. The above-described update process requires a particular person or persons to be responsible for updating the firmware associated with each workstation. Lapses in the update process may render one or more workstations associated with a network inoperable.

Problems may arise when a user attempts to install or update firmware on their workstation. One problem arises when the upload is interrupted, such as in the case of a power failure. If the updated firmware is only partially written to the memory of the remote workstation when the interruption occurs, the workstation is often disabled because the workstation's protocol remains incongruous with the server with only a partial update of the firmware. The disabling of the workstation may also occur in similar fashion if there is an error in the firmware load module.

Another problem associated with updating firmware of a remote workstation using an upload arrangement arises from security risks. Unauthorized persons can force undesirable software onto the workstation during the upload of the desired updated firmware, or may block the upload process. Diagnostic mechanisms which allow the insertion of code from an external source are particularly susceptible to attack.

SUMMARY OF THE INVENTION

The invention is a method and apparatus for synchronizing firmware, such as versions of software, associated with a first computer device and a second computer device.

In accordance with one embodiment of the invention, the method comprises the steps of transmitting information regarding a characteristic of the firmware associated with the first device from the first device to the second device, comparing the firmware information transmitted from the first device to information regarding the same characteristic of the firmware associated with the second device, and associating new or different firmware with the second device if the characteristics associated with the firmware of the first and second devices are not the same to thereby synchronize the firmware associated with the two devices.

In accordance with one or more embodiments of the invention, in the event the firmware associated with the second device is not the same as that of the first device, then the firmware associated with the second device is modified to match or synchronize with that of the first device by loading updated firmware to the second device.

In accordance with one or more embodiments of the invention, updated firmware is not installed onto the second device until the integrity of the updated firmware is verified. This prevents the introduction of unwanted code, such as a virus, untrusted code, or other unauthorized code to the system. In one embodiment, the firmware to be installed to the second device comprises a load module having a private key associated therewith and the step of verifying comprises using a public key to verify the private key.

In accordance with one or more embodiments of the invention, the first device is a server which is capable of providing services to a number of interface devices, and the second device comprises one of such interface devices. In accordance with one embodiment, the second device includes a memory element onto which the firmware is loaded and a read-only memory area which includes emergency firmware for ensuring the device is not rendered inoperative in the event updated firmware is not properly or completely installed.

In one or more embodiments, computer hardware and/or software is arranged to perform the method of the invention.

Further objects, features and advantages of the invention will become apparent from the detailed description of the drawings which follows, when considered with the attached figures.

BRIEF DESCRIPTION OF THE DRAWINGS

FIG. 3 is a flowchart illustrating one embodiment of a method of the invention;

FIG. 4 is a flowchart illustrating one embodiment of a method of updating firmware in accordance with the method illustrated in FIG. 3;

FIG. 5 is a flowchart illustrating one embodiment of a method of verifying firmware in accordance with the method illustrated in FIG. 4;

DETAILED DESCRIPTION OF THE INVENTION

The invention is a method and apparatus for synchronizing the firmware associated with two or more computers or other devices which are to communicate by electronic means. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Environment

As described in more detail below, embodiments of the invention have application to a variety of first and second devices arranged to communicate electronically. One computer system architecture or system with which the invention is applicable is the environment described in FIG. 1. In this system, the at least one first device comprises a computer device in the form of a central computer data source and the at least one second device comprises a computer device in the form of a "Human Interface Device" (HID). As described in more detail below, in this architecture, some or all computing is done by the central data source or service, with the output of the data source provided to a HID. The HID is capable of receiving data and displaying data.

Figure 1:
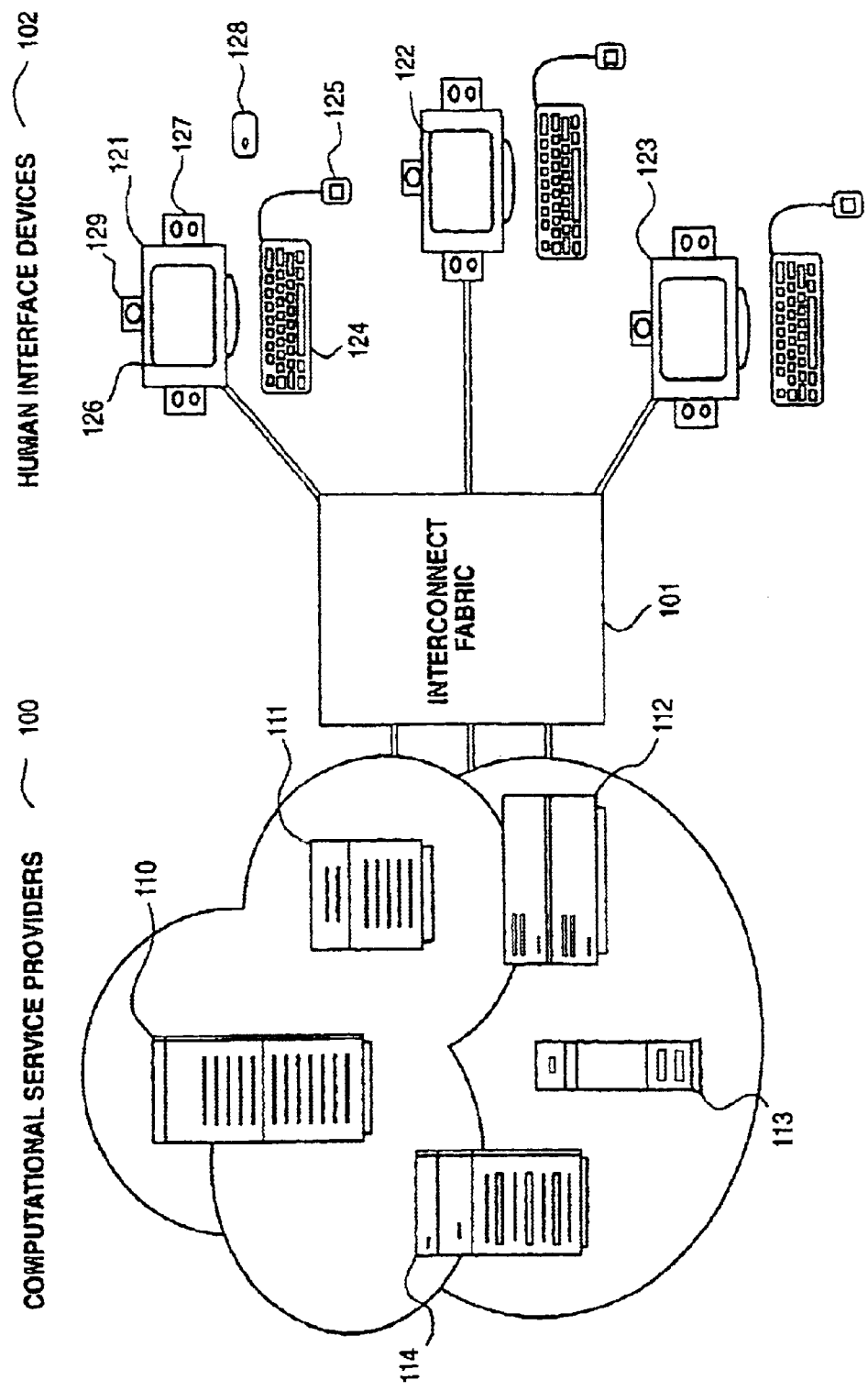
FIG. 1 illustrates a computer architecture or system with which the present invention has particular utility.

In the system illustrated in FIG. 1, the central data source comprises one or more computational service providers or servers 100. The one or more service providers 100 communicate with one or more HIDs through some interconnect fabric 101, such as a network.

In this arrangement, the computational power and state maintenance is found in the service providers. The services are not tied to a specific computer, but may be distributed over one or more traditional desktop systems such as the computer device described in connection with FIG. 9 below. One computer may have one or more services, or a service may be implemented by one or more computers. The service provides computation, state, and data to the HIDs and the service is under the control of a common authority or manager. In FIG. 1, the services are found on computers 110, 111, 112, 113 and 114. The central data source can also be providing data that comes from outside of the central data source, such as for example, the Internet or world wide web.

It is the responsibility of the service to handle communications with the HID that is currently being used to access the given service. This involves taking the output from the computational service and converting it to an acceptable protocol for the HID. A method for insuring the compatibility of both participants using this protocol is described in detail below.

The interconnect fabric is any of multiple suitable communication paths for carrying data between the services and the HIDs. In one embodiment the interconnect fabric is a local area network implemented as an Ethernet network. Any other local network may also be utilized.

In one embodiment, the interconnect fabric provides actively managed, low-latency, high bandwidth communications between the HID and the services being accessed.

The HID is the means by which users access computational services provided by the servers or services, and as such the HID may also be referred to as a client or user workstation or terminal. FIG. 1 illustrates HIDs 121, 122 and 123. In the embodiment illustrated, a HID consists of a display 126, a keyboard 124, a mouse 125, and audio speakers 127. The HID includes the electronics needed to interface these devices to the interconnection fabric and to transmit to and receive data to and from the services.

Figure 2:
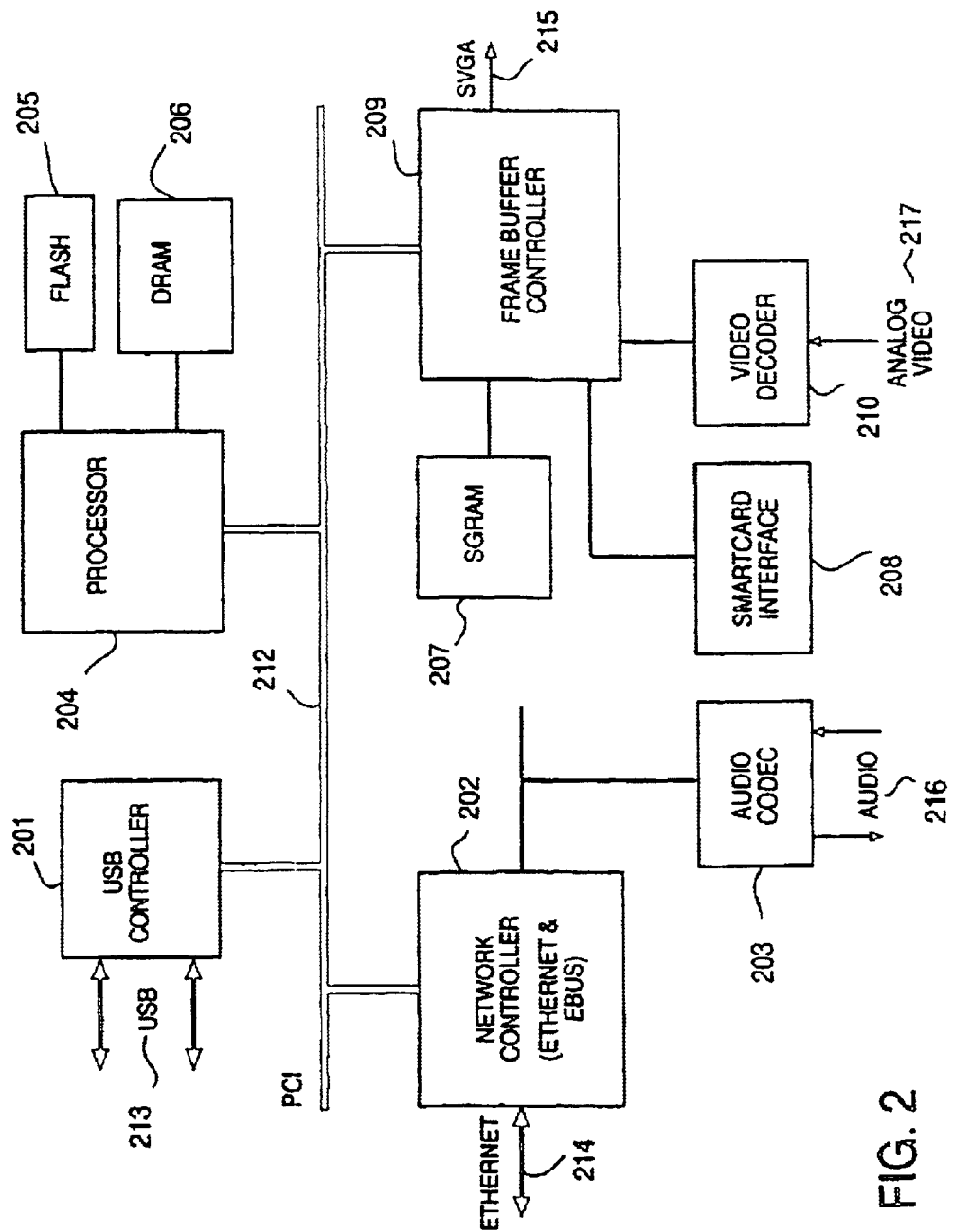
FIG. 2 is a block diagram illustrating one embodiment of a Human Interface Device of the system illustrated in FIG. 1.

A block diagram of one embodiment of a HID is illustrated in FIG. 2. The components of the HID are coupled internally to a PCI bus 212. A network control block 202 communicates with the interconnect fabric, such as an Ethernet, through line 214. An audio codec 203 receives audio data on interface 216 and is coupled to block 202. USB data communication is provided on lines 213 to USB controller 201.

An embedded processor 204 may be, for example, a Sparc2ep™ with coupled flash memory 205 and DRAM 206. The USB controller 201, network controller 202 and embedded processor 204 are all coupled to the PCI bus 212. Also coupled to the PCI 212 is the video controller 209. The video controller 209 may be for example, an ATI Rage 128 frame buffer controller (or any other suitable controller) that provides SGA output on line 215. NTSC or PAL data is provided into the video controller through video decoder 210. A smartcard interface 208 may also be coupled to the video controller 209.

Alternatively, the HID can be implemented using a single chip solution including the necessary processing capability.

This architecture or system is described in greater detail in U.S. patent application Ser. No. 09/063,335, assigned to the present assignee, filed Apr. 20, 1998, entitled "Method and Apparatus For Providing A Virtual Desktop System Architecture" incorporated herein by reference.

Method for Synchronizing Firmware

One or more embodiments of the invention comprise a method for synchronizing firmware associated with at least two devices.

As used herein the term "firmware" is intended to include, but not be limited to, any element arranged to permit a device to transmit and/or receive data or information, such as software or applications defining a protocol by which information is sent or received. As used herein the term "synchronize" is intended to include, but not be limited to the act or result of causing two devices or the elements associated therewith to have the capacity to compatibly transmit and receive information or data.

One embodiment of the invention will be described in conjunction with the system described above and illustrated in FIG. 1. In accordance with this embodiment, and as illustrated in FIG. 3, in a first step S1, the second device is started. In one or more embodiments, such a step may comprise booting or powering up a HID as described above.

In a step S2, information regarding the firmware associated with the first and second devices is provided. In one or more embodiments, the provided information is set of parameters comprise data regarding a common characteristic of the firmware associated with each device. In one or more embodiments, this characteristic information comprises a string that represents the current software revision or version or edition associated with the device.

In one or more embodiments, this step includes the step of the first device which is to provide a service to the HID, such as a central server, sending a set of initial protocol parameters to the HID upon request. The HID or second device may provide the information in memory. When the server or other first device provides the information to the second device, the data may be sent to the HID upon the HID's sending a request, such as at boot-up.

Of course, it will be appreciated that the second device, such as a HID, might be arranged to send the information to the server or other first device.

A step S3 of the method comprises comparing the provided information to determine if the firmware is synchronized. In one or more embodiments, the step comprises the second device, such as a HID, compares its firmware information, such as a version of particular software, to that indicated by the set of parameters sent by the first device, such as a central server. In one or more embodiments, this comparison comprises the step of determining if the version of the software of the HID is the same as that indicated by the central server. The comparison step may comprise determining if the data string representing the version of the firmware associated with the server is identical to the data string representing the version of the firmware associated with the HID.

If the versions of the software are the same or matching (i.e. the firmware is already synchronized) then in a step S5, the synchronization sequence ends. If the versions are not the same, then in a step S4, the firmware associated with the HID is updated and then in a step S5 the sequence ends.

One embodiment of a method by which the firmware associated with the HID is updated (as in step S4 of FIG. 3) will be described in conjunction with FIG. 4.

In a first step S401, the central server or other service instructs the HID which version of the firmware the HID is to implement, and where to obtain the necessary firmware. For example, the central server may instruct the HID to obtain version XX.Y of particular software from a particular firmware computer or server.

In a step S402, the HID seeks the appropriate firmware server and determines if the firmware which is to be obtained is valid. In one or more embodiments, where the firmware is obtained in the form of a load module which is loaded into memory associated with the HID from the server, the HID determines if the load module is the correct version, is legitimate, uncorrupted and the like. If so, in a step S403 the HID uploads or updates the firmware and installs it. If not, the firmware update is terminated. In such an event, the HID may be arranged to requests from the central server or service another server from which the desired firmware may be obtained.

One embodiment of a method by which an HID determines if a load module is legitimate (step S402 of FIG. 4) will be described in more detail with reference to FIG. 5.

In a first step S402A, the HID obtains a load module from the firmware server and transfers it to memory. In one or more embodiments, the type of memory to which the load module is transferred is a temporary memory or similar storage location. For example, the HID may load the load module to DRAM (such as DRAM 206 illustrated in FIG. 2 and described above).

In a step S402B, the load module is decompressed, if necessary.

In a step S402C, the HID verifies at least one identifying element associated with the load module. In one or more embodiments, the step comprises verifying at least a digital signature associated with the load module. In one or more embodiments, the step comprises verifying both a header and a signature associated with the load module.

In one or more embodiments, each load module is provided with a header which contains one or more pieces of information, such as the size of the load module. In the event that the HID verifies the header information, this aspect of the verification step is completed. If not, the HID will not execute the load module, and the HID may recontact the central server or other provider for information as to where to attempt to obtain a valid load module.

In one or more embodiments, each load module includes a digital signature in the form of a private key or code which is associated with the load module by the manufacturer. The client (i.e. HID) is provided with a public key associated with the private key, the public key used to verify the signature generated by the private key. If the digital signature is verified, then this portion of the verification step is complete. If not, the HID will not execute the load module, and the HID may recontact the central server or other provider for information as to where to attempt to obtain a valid load module.

As is well known, there are a variety of manners for implementing such a private/public key arrangement. In one or more embodiments, the keys are encrypted to ensure their integrity.

Figure 6A:
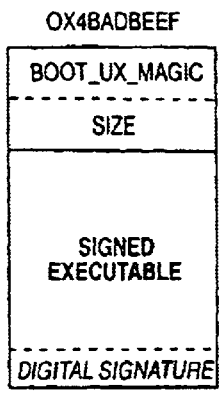
FIGS. 6(a)–(c) illustrate embodiments of firmware load modules in accordance with embodiments of the invention.
Figure 6B:
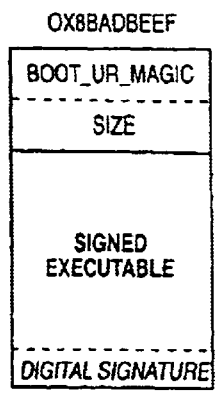
Figure 6C:
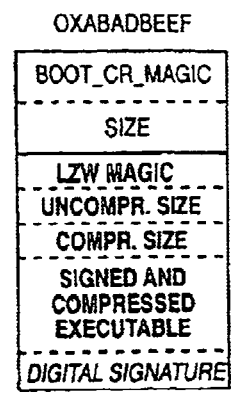

FIGS. 6(a)–(c) illustrate load module formats which include a header and digital signature as described above. Of course, the load modules may be arranged in a variety of manners and still provide the verification feature disclosed above. If the firmware which is being installed or uploaded to the device is not in the form of a load module, the firmware is still desirably configured to include information such as that described above for ensuring the integrity of the firmware.

If the load module is verified, then and only then is the load module is accepted, such as by writing it to a memory associated with the HID, such as the read/write portion of the flash 205 of the HID. In this arrangement, the load module is not written to the flash unless the load module is verified.

As another aspect of the invention, there is provided a method for ensuring that a partial or otherwise incomplete update of the firmware does not render the HID inoperative. In accordance with this method, the HID includes a means for starting or booting the HID in the event certain of the firmware associated with the HID is corrupt. In one or more embodiments, this means comprises an emergency trivial file transfer protocol (TFTP) loader application associated with the HID. In one or more embodiments, the emergency loader application is stored in a write-protected sector of the HID's flash 205.

Figure 7:
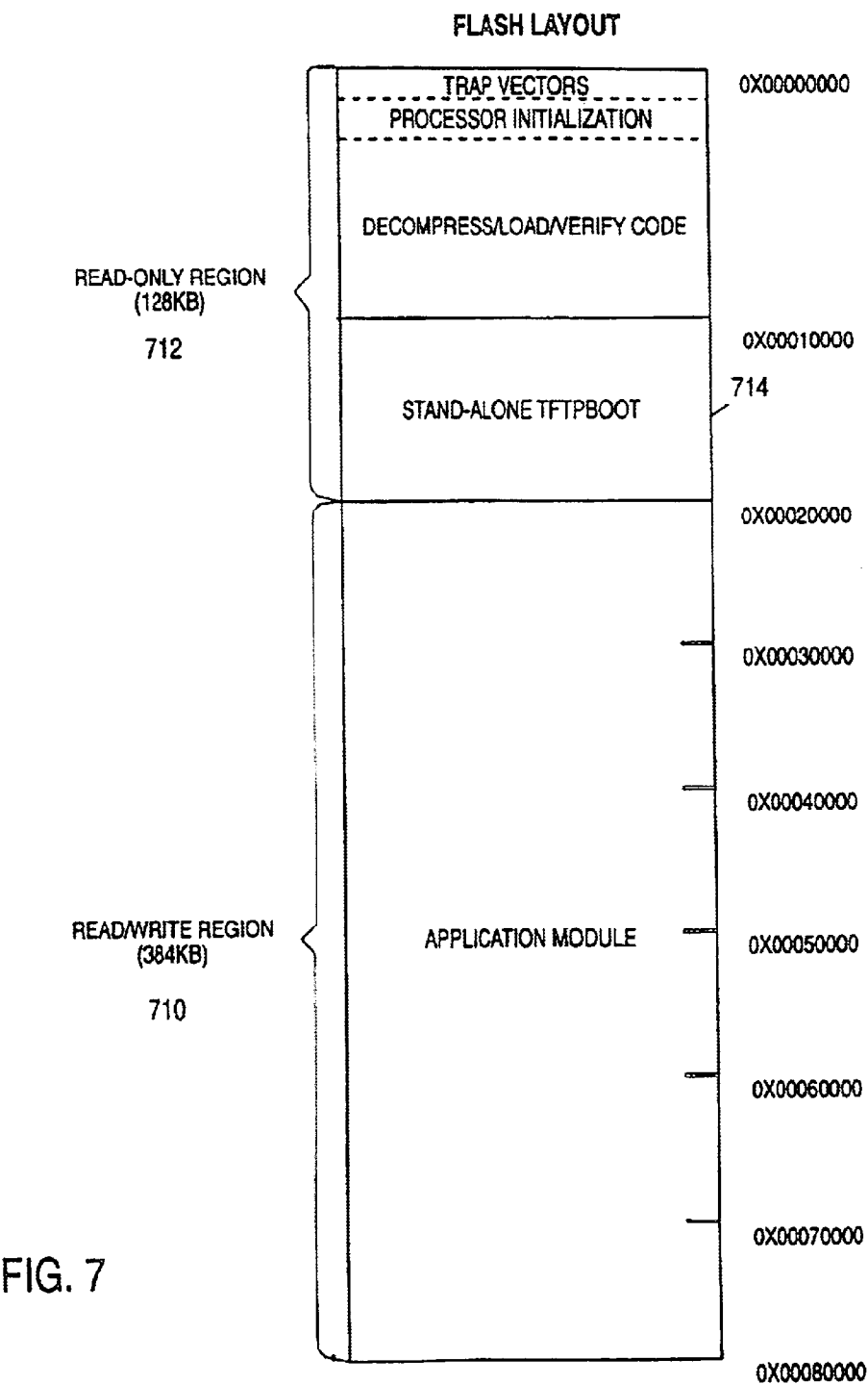
FIG. 7 illustrates an embodiment of a memory arrangement onto which a load module may be installed.

FIG. 7 illustrates an arrangement of a flash memory 205 for implementing this method. As illustrated therein, the flash has a first read/write region 710 and a second read-only region 712. The read-only region 712 includes a stand-alone TFTP boot or "emergency loader" 714 program. This emergency loader program 714 includes a protocol for transferring files, such as the desired updated firmware load module.

This figure also illustrates that the load module verification steps of the method may be associated with an application which is stored in a memory associated with the HID. In the embodiment illustrated, the application is stored in the read-only region 712 of the HID's flash memory 205, and copied to HID memory on power-up.

In accordance with the method, the emergency loader 714 can not be overwritten, even with a load module which is being uploaded in order to synchronize firmware. In the event of a failure in a normal boot application stored in the main read/write region 710, the emergency loader 714 may be utilized to contact the central server to obtain updated firmware in the form of a load module. In the event the load module is obtained in this manner, one embodiment of the method includes the step of performing a reboot of the HID, whereby the updated application will run instead of the emergency loader after the load module is successfully installed.

In accordance with the above-described method, the only time an HID can not be used on demand is in the event a firmware update was unsuccessful and the emergency loader is unable to get a good load from a firmware server. In such an event, however, the HID is only temporarily disabled until the emergency loader is able to contact a firmware server and obtain and complete an update of the firmware.

Figure 8:
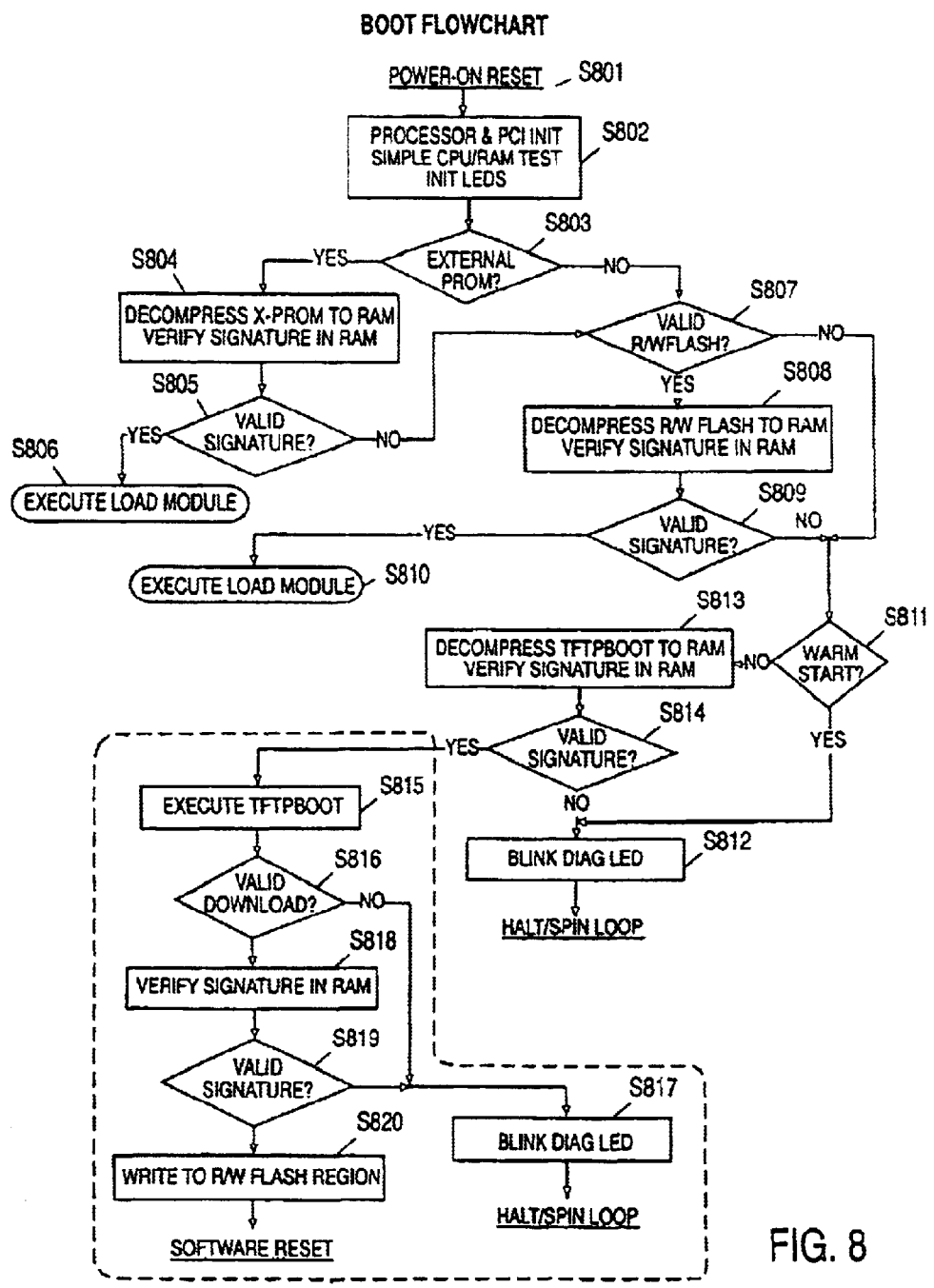
FIG. 8 is a flowchart illustrating a boot sequence in accordance with a method of the invention.

FIG. 8 is a flowchart illustrating an embodiment of a boot sequence for a HID incorporating the method described above. In a step S801, the HID is powered, booted up or reset. In a step S802 an initialization and testing sequence is completed, as is well known in the art of computer devices. In a step S803 it is determined if there is an external PROM. If yes, then in a step S804 the information contained on the external PROM is decompressed into RAM (such as DRAM 206 illustrated in FIG. 2). The information contained on the external PROM may comprise a load module comprising firmware. In step S805, it is determined if the load module has a valid signature (as described above in conjunction with step S402C). If so, the load module is executed in a step S807.

If in step S805 it is determined that the signature associated with the load module is not valid or if in step S803 it is determined that there is no external PROM, then in a step S807 it is determined if there is a valid read/write flash. It is noted that in most instances an external PROM will not be present. The external PROM may be associated with the HID when the HID is initialized or started the very first time, or when the HID is rendered completely inoperable through destruction of all code on its flash.

If in step S807 it is determined that there is a valid read/write flash, i.e. that the proper firmware is present in the read/write section of the HIDs flash, then in a step S808 the firmware is decompressed into RAM. In a step S809 it is then determined if the firmware, such as a load module, has a valid signature (as described above in conjunction with step S402C). If so, the load module is executed in a step S810.

If the signature is not valid, then in a step S811 it is determined if the HID was started cold or warm (i.e. cold or warm boot). If the signature is invalid and the boot was a warm boot, then in a step S812 the sequence ends with an indication to a user of failure and the need to reboot the HID, such as by blinking an LED indicator.

If the boot sequence was cold (i.e. warm=no) then in a step S813 the emergency boot sequence is started by decompressing the TFTP boot information to RAM. In step S814 it is determined if the signature associated with the information loaded into RAM is valid. If not, then in step S812 the sequence ends as described above (a bad signature indicating that the firmware has been compromised).

If the signature is valid, then in a step S815 the TFTP boot is executed. As described above, the TFTP boot is designed to seek a new copy of the load module. In a step S816 it is determined if the load module is found and uploaded. If not, then in a step S817 the sequence ends in a similar manner to that associated with step S812.

If a valid upload of the load module is obtained, then in a step S818 the signature associated with the load module is verified. If in step S819 it is determined that the signature is invalid, the sequence ends in step S817. If the signature is valid, indicating the integrity of the load module, then in a step S820 the load module is written to the read/write portion of the flash of the HID, and a reset occurs.

It should be understood that the load module may be obtained from a variety of sources. In the above-described sequence, the load module is first obtained from an external PROM. Of course, the load module might be obtained from a network or a variety of other types of memory devices. In addition, while the load module and TFTP emergency boot have been described as associated with flash-type memory, they may be associated with a variety of other types of memory. A load module may also be obtained through a diagnostic port associated with the HID or other device. Regardless of the source, however, the integrity or validity of the firmware is always confirmed through the use of a digital signature authorization.

In accordance with the above-described method, the server or other central device is arranged to update or synchronize the firmware of the remote device, or HID. In this arrangement, the HID or other remote device is prevented from updating or changing the firmware which is on the central device or server.

In accordance with the above-described method, if the firmware associated with a central device, such as a server, is updated, then all of the remote devices such as HIDs are automatically updated as well. In one or more embodiments of the invention, instead of the update or synchronization process only occurring after the HID or other device is powered or booted up, the synchronization may be arranged to occur at a wide variety of times. For example, a server may be arranged to send a signal to each HID to trigger the update process at predetermined intervals.

In accordance with one aspect of the above-described method, the firmware associated with the two devices is synchronized regardless of which device has the older or newer version. This is because synchronization occurs whenever the firmware associated with the two devices is not identical, not just when one device, such as the HID, has a numerically lower or higher version that the central device. Thus, even if the server has an older version of the firmware than the HID, the firmware associated with the HID will be synchronized with that of the server by installing the older version of the firmware onto the HID. This ensures that the server and all HIDs are always operating with common firmware.

While in the method described above the firmware which is described as being loaded to the HID is the same version as that of the first device, such as a server, such need not be the case. As provided above, an aspect of the invention is to synchronize the devices so that they utilize a protocol which permits compatible communication. In some instances, an HID and a server may operate with different versions of firmware which still achieve this goal. Thus, as other aspects of the invention, the firmware which is uploaded to an HID need to be the same as that of the server, as long as the uploaded firmware ultimately provides the desired synchronization in protocol. In this regard, in the "comparing" step (S3 in FIG. 3) it is only necessary to determine if the firmware is matching or the same such as to determine whether the firmware is already synchronized.

By way of example, if versions 6.0a and 6.0b of particular firmware are compatible, the HID may be arranged to compare a string X.X (eliminating the a and b) provided by the server to its version to determine if the firmware is synchronized. If the HID is operating with non-compatible version 5.0a, then the strings 5.0 and 6.0 will not match, indicated that the firmware is not synchronized and requiring the HID to install new firmware. The newly installed or uploaded firmware may be version 6.0a or 6.0b, regardless of what version the server is using, since either version provides synchronization.

While methods of the invention have been described in association with the system illustrated in FIG. 1, as described above, embodiments of the invention may be associated with a wide-variety of other systems or devices, such as general purpose computer 900 illustrated in FIG. 9 and described in more detail below. Thus, an embodiment of the invention can be implemented as computer software in the form of computer readable code executed on computer 900 or other device, or in the form of bytecode class files executable within a Java™ runtime environment running on such a computer or other device, or in the form of bytecodes running on a processor (or devices enabled to process bytecodes) existing in a distributed environment (e.g., one or more processors on a network).

Figure 9:
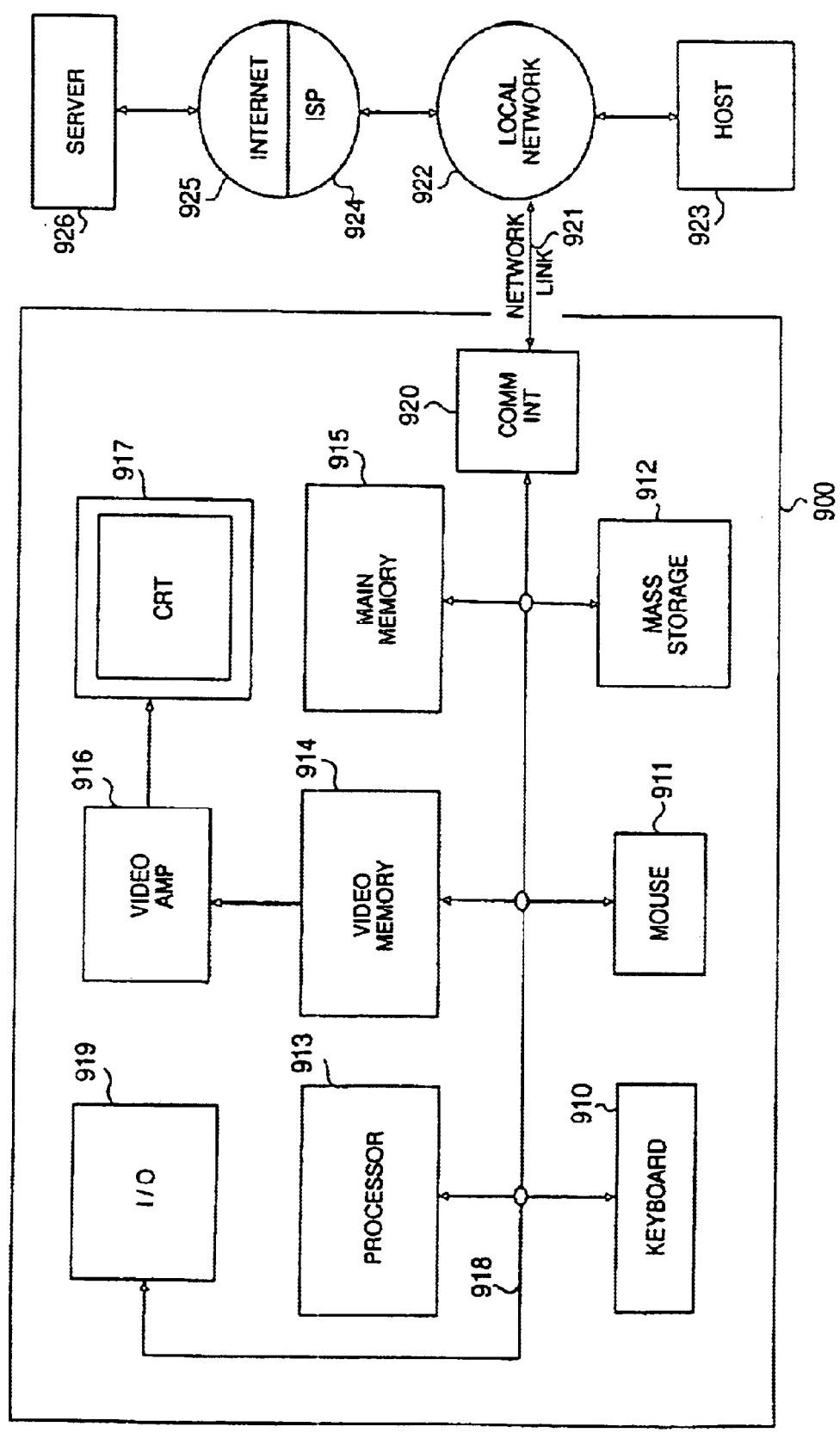
FIG. 9 is a block diagram of one embodiment of a computer system capable of providing a suitable execution environment for an embodiment of the invention.

Referring to FIG. 9, the general purpose computer 900 includes a keyboard 910 and mouse 911 coupled to a system bus 918. The keyboard and mouse are for introducing user input to the computer system and communicating that user input to processor 913. Other suitable input devices may be used in addition to, or in place of, the mouse 911 and keyboard 910. I/O (input/output) unit 919 coupled to system bus 918 represents such I/O elements as a printer, A/V (audio/video) I/O, etc.

Computer 900 includes a video memory 914, main memory 915 and mass storage 912, all coupled to system bus 918 along with keyboard 910, mouse 911 and processor 913. The mass storage 912 may include both fixed and removable media, such as magnetic, optical or magnetic optical storage systems or any other available mass storage technology. Bus 918 may contain, for example, thirty-two address lines for addressing video memory 914 or main memory 915. The system bus 918 also includes, for example, a 64-bit data bus for transferring data between and among the components, such as processor 913, main memory 915, video memory 914 and mass storage 912. Alternatively, multiplex data/address lines may be used instead of separate data and address lines.

In one embodiment of the invention, the processor 913 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor or display 917. Video amplifier 916 is well known in the art and may be implemented by any suitable apparatus. This circuitry converts pixel data stored in video memory 914 to a raster signal suitable for use by monitor 917. Monitor 917 is a type of monitor suitable for displaying graphic images.

Computer 900 may also include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to local server computer 923 or to data equipment operated by an Internet Service Provider (ISP) 924. ISP 924 in turn provides data communication services through the world wide packet data communication network now commonly referred to as the "Internet" 925. Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Computer 900 can send messages and receive data, including program code, through the network(s), network link 921, and communication interface 920. In the Internet example, remote server computer 926 might transmit a requested code for an application program through Internet 925, ISP 924, local network 922 and communication interface 920.

The received code may be executed by processor 913 as it is received, and/or stored in mass storage 912, or other non-volatile storage for later execution. In this manner, computer 900 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

As will be appreciated by those of skill in the art, there is a wide variety of configurations for hardware and software for accomplishing the method of the invention other than that described above.

Of course, the foregoing description is that of preferred embodiments of the invention, and various changes and modifications may be made without departing from the spirit and scope of the invention, as defined by the claims.

What is claimed is:

1. A computer network comprising:
   a network;
   at least one client computer;
   at least one server connected with said at least one client computer via said network;
   means for determining if a first firmware associated with said at least one server having a first protocol is synchronized with a second firmware associated with said at least one client computer having a second protocol; and
   means for associating a third firmware with said at least one client computer in the event said first and second firmware are not synchronized;
   wherein said third firmware synchronizes said second firmware with said first firmware to ensure that said second protocol is compatible with said first protocol; and
   wherein upon ensuring that said second protocol is compatible with said first protocol, said at least one client can properly communicate with said at least one server via said network.

2. The computer network of claim 1 wherein said third firmware does not synchronize said first firmware with said second firmware.

3. The computer network of claim 1 wherein said third firmware modifies said client computer to be synchronized with said server.

4. The computer network of claim 3 wherein said determining means are located within said client computer.

5. The computer network of claim 1 wherein the computer network modifies said client computer to be compatible with said server and does not modify said server to be compatible with said client computer.

6. The computer network of claim 1 wherein:
   said determining means comprises means for providing a first characteristic of said first firmware associated with said at least one server and a second characteristic of said second firmware associated with said at least one client;
   said determining means further comprises means for determining if said first and second characteristics match; and
   said associating means comprises means for verifying said third firmware before said third firmware synchronizes said second firmware with said first firmware to ensure that said second protocol is compatible with said first protocol.

7. The computer network of claim 1 wherein said at least one client computer comprises a first memory for uploading said third firmware via said network and a second memory for running said third firmware on said at least one client computer.

8. The computer network of claim 7 wherein said at least one client computer first decompresses said third firmware in said first memory before installing said third firmware into said second memory.

9. The computer network of claim 8 wherein said third firmware is verified before said third firmware is run on said at least one client.

10. The computer network of claim 8 wherein if said third firmware is not valid, a new copy of said third firmware is uploaded from said network into said first memory.

11. The computer network of claim 8 wherein said first memory comprises a read only memory (ROM) and said second memory comprises a random access memory (RAM).

12. The computer network of claim 1 wherein:
    said third firmware is uploaded from said network to said at least one client computer via a load module, said load module comprising a first memory holding said third firmware, a stand-alone boot, and a second memory holding said stand-alone boot;
    said associating means comprises verifying means to verify said third firmware; and
    said at least one client computer runs said stand-alone boot when said verifying means can not verify said third firmware.

13. The computer network of claim 12 wherein said stand-alone boot can not be overwritten once said stand-alone boot has been written into said second memory on said load module.

14. The computer network of claim 12 wherein said stand-alone boot can be used to reboot said at least one client computer.

15. The computer network of claim 13 wherein said stand-alone boot can be further used to locate and upload a new copy of said third firmware if said stand-alone boot does not reboot said at least one client computer.

16. A computer network comprising:
    a network;
    a client;
    a server connected with said client via said network;
    means for determining if a first firmware associated with said server having a first protocol is synchronized with a second firmware associated with said client having a second protocol; and
    means for associating a third firmware and a fourth firmware with said client in the event said first and second firmware are not synchronized;
    wherein said third firmware ensures that said second protocol is compatible with said first protocol;
    wherein upon ensuring that said second protocol is compatible with said first protocol, said client and said server can properly communicate with each other via said network;
    wherein said third firmware is prevented from associating with said client unless a validity of said third firmware is verified; and
    wherein said fourth firmware provides an emergency operation on said client if said third firmware is determined to be not valid.

17. The computer network of claim 16 wherein said fourth firmware is configured to locate another firmware for ensuring that said second protocol is compatible with said first protocol.

18. The computer network of claim 16 wherein said fourth firmware is configured to reboot said client.

19. The computer network of claim 16 wherein said fourth firmware is configured to locate another firmware for ensuring that said second protocol is compatible with said first protocol if said client is started with a cold boot sequence and is configured to reboot said client if said client is started with a warm boot sequence.

20. A computer network comprising:

a network;

a Human Interface Device (HID) providing an interface to a user;

a computational service provider connected with said HID via said network, said computational service provider providing a computational power for said user and a state maintenance for said user via said HID to said user;

a firmware server connected with said HID via said network, said firmware server providing a load module via said network to said HID;

means for determining if a first firmware associated with said computational service provider having a first protocol is synchronized with a second firmware associated with said HID having a second protocol; and means for uploading said load module from said firmware server into said HID in the event said first and second firmware are not synchronized;

wherein said load module comprises a third firmware for ensuring that said second protocol is compatible with said first protocol to ensure that said HID can communicate with said computational service provider;

wherein upon ensuring that said second protocol is compatible with said first protocol, said HID and said computational service provider can properly communicate with each other via said network;

wherein said third firmware is prevented from associating with said HID unless validity of said third firmware is verified;

wherein said load module further comprises a fourth firmware providing an emergency operation on said HID if said third firmware is determined to be not valid; and wherein said computational power and said state maintenance for said user are located in said computational service provider.

21. The computer network of claim 20 wherein said load module further comprises a read-only region and a read/write region and wherein third firmware is stored in said read/write region and said forth firmware is stored in said read-only region.

* * * * *